US010254549B2

(12) United States Patent
Katano et al.

(10) Patent No.: US 10,254,549 B2
(45) Date of Patent: Apr. 9, 2019

(54) HEAD-MOUNTED DISPLAY

(71) Applicant: Brother Kogyo Kabushiki Kaisha, Nagoya-shi, Aichi-ken (JP)

(72) Inventors: Tomomi Katano, Nagoya (JP); Yusuke Fukuda, Kobe (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/851,866

(22) Filed: Dec. 22, 2017

(65) Prior Publication Data

US 2018/0120569 A1    May 3, 2018

Related U.S. Application Data

(63) Continuation of application No. PCT/JP2017/009427, filed on Mar. 9, 2017.

(30) Foreign Application Priority Data

Mar. 30, 2016   (JP) ................. 2016-067675

(51) Int. Cl.
  *G02B 27/14*    (2006.01)
  *G09G 5/00*    (2006.01)
  (Continued)

(52) U.S. Cl.
  CPC ..... *G02B 27/0172* (2013.01); *G02B 27/0176* (2013.01); *H04N 9/3173* (2013.01);
  (Continued)

(58) Field of Classification Search
  CPC .. G02B 27/01; G02B 27/0101; G02B 27/017; G02B 27/0172; G02B 2027/0192
  (Continued)

(56) References Cited

U.S. PATENT DOCUMENTS 5,949,388 A     9/1999  Atsumi et al.
2012/0013984 A1  1/2012  Ikeda

FOREIGN PATENT DOCUMENTS

JP     H08-251510 A    9/1996
JP     H09-508711 A    9/1997
(Continued)

OTHER PUBLICATIONS

Jun. 6, 2017—International Search Report—Intl App PCT/JP2017/009427.

(Continued)

*Primary Examiner* — William Choi

(74) *Attorney, Agent, or Firm* — Banner & Witcoff, Ltd.

(57) ABSTRACT

A head-mounted display includes an image forming part, a half mirror reflecting a part of an image light emitted by the image forming part toward an optical pupil position, and a wall part. Given that an intersection point between the half mirror and an optical axis of the image light is defined as a first intersection point, an intersection point between the wall part and the optical axis is defined as a second intersection point, a distance between the first intersection point and the second intersection point is defined as a first distance, and an angle at which the wall part inclines with respect to the optical axis is defined as a first angle, the first angle and the first distance are set such that the image light passed through the half mirror and reflected by the wall part reaches a position different from an optical pupil position.

6 Claims, 5 Drawing Sheets

(51) Int. Cl.
    *G02B 27/01*     (2006.01)
    *H04N 9/31*     (2006.01)
    *H04R 1/00*     (2006.01)
    *G02B 27/00*     (2006.01)

(52) U.S. Cl.
    CPC ........... H04R 1/00 (2013.01); *G02B 27/0018* (2013.01); *G02B 2027/012* (2013.01); *G02B 2027/0121* (2013.01); *G02B 2027/0154* (2013.01)

(58) Field of Classification Search
    USPC .......................... 359/629, 630, 633; 345/7–9
    See application file for complete search history.

(56) References Cited

FOREIGN PATENT DOCUMENTS

| | | |
|---|---|---|
| JP | 2010-134134 A | 6/2010 |
| JP | 2012-023495 A | 2/2012 |
| JP | 2012-159680 A | 8/2012 |
| JP | 2012-214897 A | 11/2012 |
| WO | 9521395 A1 | 8/1995 |

OTHER PUBLICATIONS

Oct. 2, 2018—(WO) International Preliminary Report on Patentability—App PCT/JP2017/009427, Eng Tran.

HEAD-MOUNTED DISPLAY

CROSS-REFERENCE TO RELATED APPLICATION

This is a Continuation of International Application No. PCT/JP2017/009427 filed on Mar. 9, 2017, which claims priority from Japanese Patent Application No. 2016-067675 filed on Mar. 30, 2016. The entire disclosure of the prior application is incorporated herein by reference.

BACKGROUND

Technical Field

The present disclosures relates to a head-mounted display which a user can wear on his/her head and visually recognize an image.

Related Art

Conventionally, a head-mounted display which a user can wear on his/her head and visually recognize an image has been known. Regarding such a head-mounted display, for example, there is a case where, when the head-mounted display is used in a medical site or a construction site, a portion to display an image is covered with a transparent cover for the sake of cleanliness or dustproof and waterproof. For example, a conventionally known head-mounted optical device is provided with an optical unit configured to provide a user of viewable information, and a jacket which can almost entirely cover the optical unit. The jacket has a transparent window part. The user can obtain viewable information supplied through the transparent window, from the optical unit.

SUMMARY

In the head-mounted display of a see-through type, which is provided with a half mirror configured to reflect an image toward a pupil of the user, when the vicinity of the half mirror is covered with a transparent member, there may be a case where a surface reflection occurs depending on a refractive index of the transparent member. Therefore, there may be a case where image light passed through the half mirror is reflected by the transparent member and is visually recognized by the user as image stray light. Further, there may also be a case where ambient light from the surrounding environment is reflected by the transparent member and is visually recognized by the user as ambient stray light. Due to the foregoing, there may be a case where visibility of the user is lowered.

It is an object of the present disclosures to provide a head-mounted display in which the visibility of an image is improved.

A head-mounted display according to the present disclosures includes a casing, an image forming part arranged inside the casing and configured to form image light, a half mirror arranged on a first direction side, the first direction being a direction in which the image forming part emits the image light, with respect to the image forming part, the half mirror inclining with respect to an optical axis of the image light emitted by the image forming part, the half mirror reflecting a part of the image light toward an optical pupil position located at a second direction side, the second direction being a direction which intersects with the first direction, a cover covering at least a portion on the first direction side of the casing, and a wall part provided to the cover and arranged on the first direction side of the half mirror, the wall part having light transmissivity, and inclined with respect to the first direction. Given that an intersection point between the reflective surface of the half mirror and the optical axis is defined as a first intersection point, an intersection point between a covering face, which is a half mirror side surface of the wall part, and the optical axis is defined as a second intersection point, a distance between the first intersection point and the second intersection point in the first direction is defined as a first distance, and an angle at which the covering face inclines with respect to the first direction is defined as a first angle, the first angle and the first distance are set to an angle and a distance with which the image light passed through the half mirror and reflected by the covering face reaches a position different from the optical pupil position.

BRIEF DESCRIPTION OF THE ACCOMPANYING DRAWINGS

DETAILED DESCRIPTION

Figure 1:
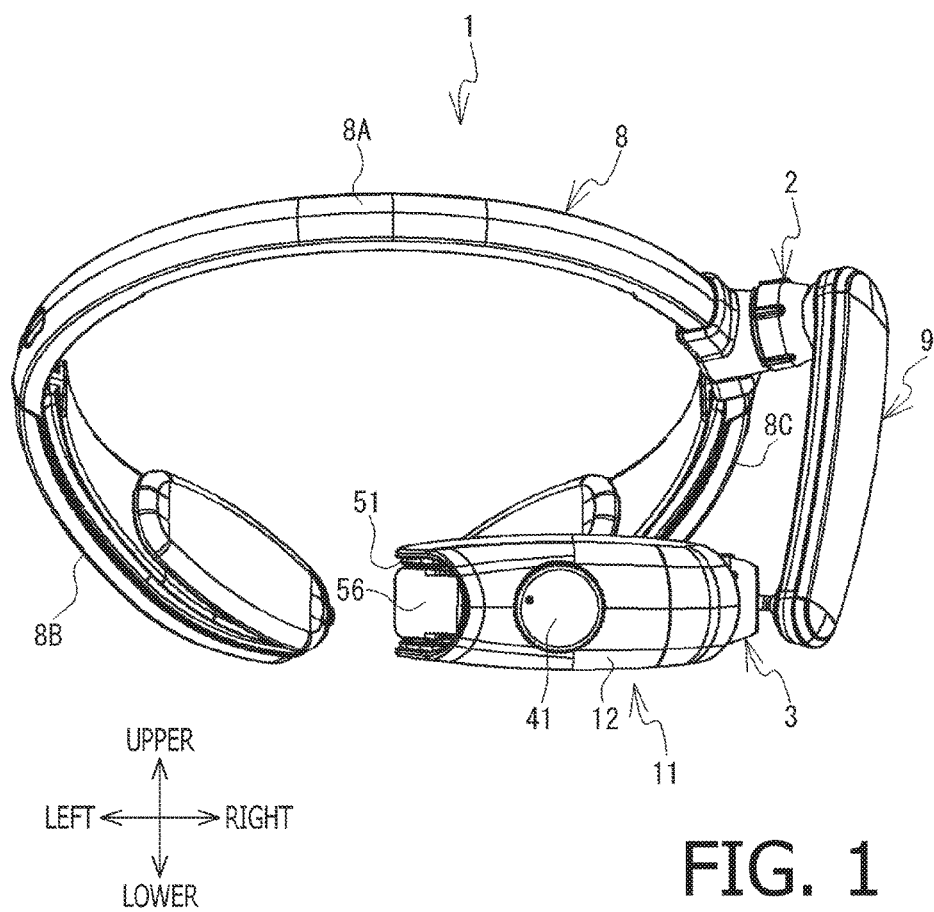
FIG. 1 is a front view of an HMD 1 in a state where a display device 11 is located in the vicinity and in front of a user's eye.

Hereinafter, description will be given of an embodiment of the present disclosures with reference to the accompanying drawings. As shown in FIG. 1, a head-mounted display (hereinafter, referred to as "HMD") 1 according to the present embodiment is an optical transmission type see-through HMD. Ambient light, being light of a landscape in front of eyes of a user, passes through a half mirror 56 and is directly guided to the eyes of the user. A projection type of the HMD 1 is a virtual image projection type. The half mirror 56 reflects image light 21 of an image, which is displayed on an image unit 7 (to be described later; see FIG. 3), toward one eye of the user (see FIG. 3). The HMD 1 can allow the user to recognize an image in a state in which the image overlaps the landscape in front of the eyes. To a display device 11 of the HMD 1, a cover 80 (see FIG. 2) is detachably attached.

A detailed structure of the HMD 1 will be described. The HMD 1 includes a display device 11, a mounting fixture 8 and a connection fixture 9. Hereinafter, in order for easy understanding of the drawings, an upper side, a lower side, a left side, a right side, a front side and a rear side of the HMD 1 will be defined. The upper side, the lower side, the left side, the right side, the front side and the rear side of the HMD 1 respectively correspond, for example, to an upper side, a lower side, a left side, a right side, a front surface side and a reverse surface side in FIG. 1. The upper side, the lower side, the rear side, the front side, the left side and the right side of the HMD 1 respectively correspond to an upper side, a lower side, a rear side, a front side, a right-hand side and a left-hand side of a user who wears the mounting fixture 8.

As shown in FIG. 1, the mounting fixture 8 can be mounted on a head of the user. The mounting fixture 8 is constituted by a flexible material such as resin and metal (e.g., stainless steel). The mounting fixture 8 is formed to be arc-shaped so as to be wearable along the head of the user. Specifically, the mounting fixture 8 includes a first section 8A and second sections 8B and 8C. Each of the first section 8A and the second sections 8B and 8C is a curved narrow elongated plate member. The first section 8A extends in a right-left direction, and is curved convexly toward the front side. The second section 8B extends from an end in one side (e.g., the left side) of the first section 8A. The second section 8C extends from an end in the other side (e.g., the right side) of the first section 8A. The second sections 8B and 8C extend in directions in which end portions thereof on sides opposite to the sides connected to the first section 8A (e.g., the rear side ends) approach each other. The mounting fixture 8 is worn on the head of the user in a state where the first section 8A, the second sections 8B and 8C contact a frontal region, a right temporal region and a left temporal region of the user, respectively. In this state, the first section 8A extends in the right-left direction along a forehead of the user.

The connection fixture 9 is a member supporting the display device 11. The connection fixture 9 extends, when viewed from the front side, in the up-down direction. A lower end portion of the connection fixture 9 extends in a direction inclined frontward with respect to the up-down direction. The connection fixture 9 is a rod-like member slightly curved to be convex rightward. The connection fixture 9 is made, for example, of resin or metal. One end side (e.g., an upper side) of the connection fixture 9 is connected to the first section 8A of the mounting fixture 8. The connection fixture 9 and the mounting fixture 8 are interconnected with a first ball joint 2. The first ball joint 2 is supported by the mounting fixture 8. The first ball joint 2 is rotatable about a first ball stud (not shown) which serves as a supporting shaft. According to this configuration, the connection fixture 9 is configured to rotate clockwise and counterclockwise with respect to the mounting fixture 8 when viewed from the right.

The other end side (e.g., the lower side) of the connection fixture 9 is connected to the display device 11, which will be described later. The connection fixture 9 is configured to support the display device 11 at a position spaced from the mounting fixture 8. The connection fixture 9 and the display device 11 is interconnected with a second ball joint 3. The second ball joint 3 is rotatable about a second ball stud (not shown) which serves as a supporting shaft. According to this configuration, the display device 11 is rotatable with respect to the connection fixture 9. The connection fixture 9 is configured to move the display device 11 by means of the first ball joint 2 and the second ball joint 3 respectively provided at both end portions.

Figure 2:
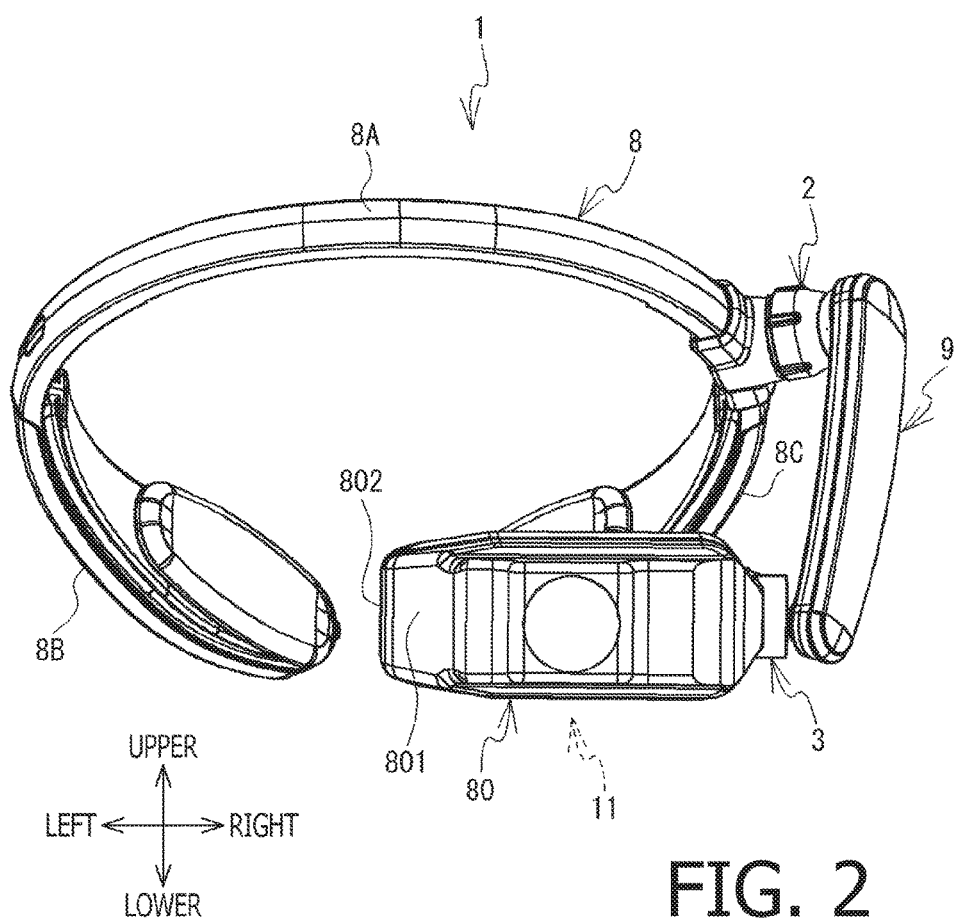
FIG. 2 is a front view of the HMD 1 in a state where a cover 80 is attached to the display device shown in FIG. 1.

The HMD 1 is configured such that, when the mounting fixture 8 is worn on the head of the user in a state where the display device 11 is arranged on a lower side with respect to the mounting fixture 8 as shown in FIGS. 1 and 2, a half mirror 56 of the display device 11 is arranged in front of a left eye of the user. A position of the optical pupil 89 shown in FIG. 3 is a position at which a human eyeball is supposed to be arranged.

The display device 11 has a box-shaped casing 12. As shown in FIG. 3, the casing 12 accommodates an adjustment mechanism 4, a lens unit 6, and an image unit 7. The casing 12 forms an appearance of the display device 11. A longitudinal direction of the casing 12 is in parallel with an optical axis 97 of an image emitted from the image unit 7. To a front part of the casing 12, a communication line 28 is connected. The HMD 1 is connected to an external device (not shown) through the communication line 28. The external device supplies image data and an electrical power to the HMD 1.

The casing 12 is formed by combining a front side first casing 13 and a rear side second casing 14. The image unit 7 is accommodated in a right part of the casing 12.

Figure 3:
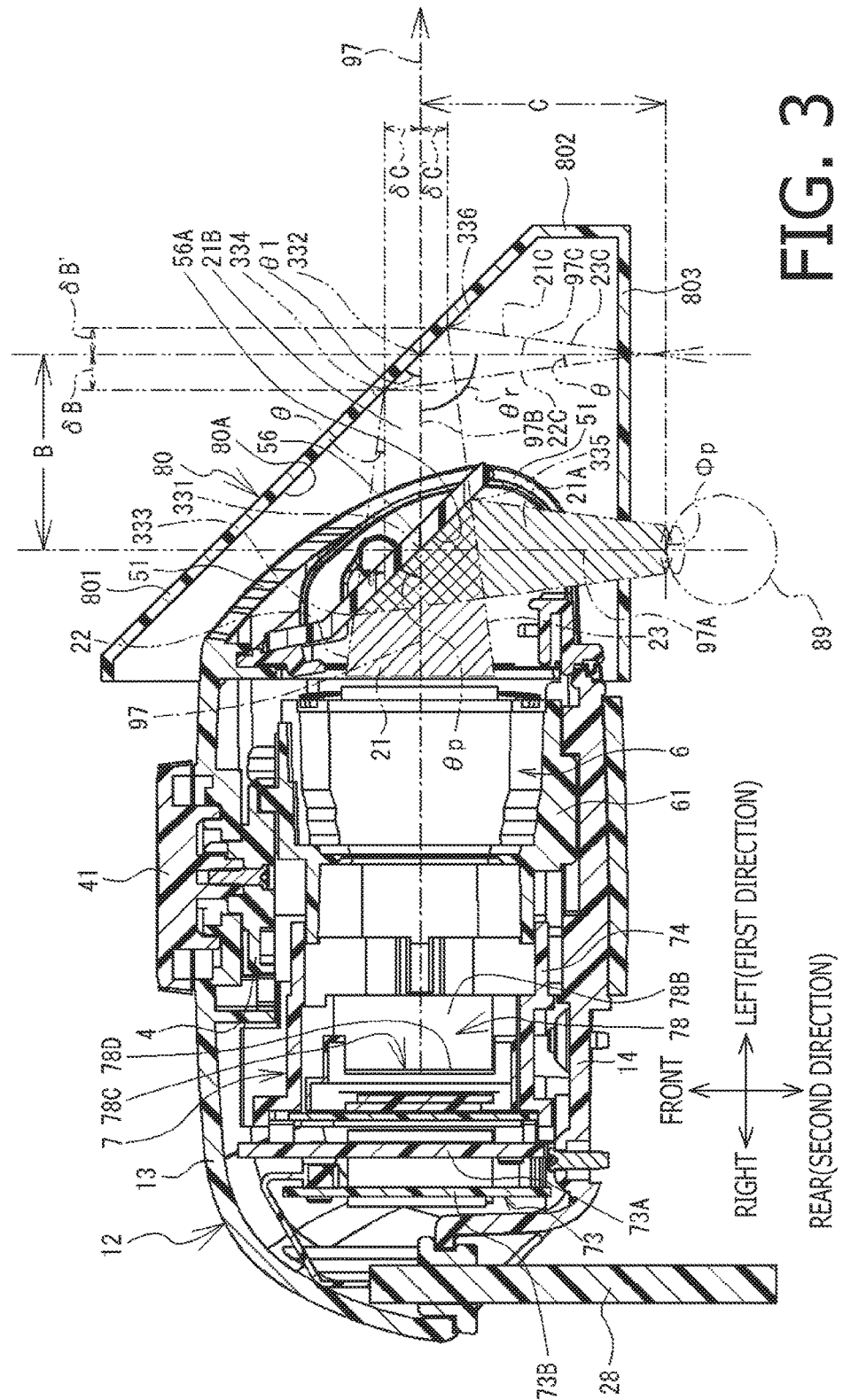
FIG. 3 is a cross-sectional view of the display device 11.

The image unit 7 forms image light 21 of an image corresponding to the image data received from the external device through the communication line 28 (see FIG. 3). The image unit 7 emits the image light to the left side thereof. In the following description, a left direction in which the image unit 7 emits the image light 21 will occasionally be referred to as a first direction. It is noted that, in FIG. 3, the image light 21 is indicated such that only a left side part with respect to the lens unit 6 is indicated with oblique lines. However, the image light 21 is emitted from the image unit 7. A position of the image unit 7 with respect to the casing 12 is fixed.

The image unit 7 includes a first holding member 74, a liquid crystal display device 78, and a second holding member 73. The first holding member 74 is a cylindrical member extending in the right-left direction.

The liquid crystal display device 78 has a light source (not shown), a light guide member 78B, and a liquid crystal display element 78C. The liquid crystal display device 78 is arranged inside the cylindrical first holding member 74. The liquid crystal display element 78C has a rectangular shape. The liquid crystal display element 78C employs a reflection type displaying method. The liquid crystal display device 78 emits an image in the first direction. An optical axis 97 of the image light 21 displayed by the image unit 7 extends in the first direction. It is noted that, in the present embodiment, the optical axis 97 is an axis extending from a central part of the liquid crystal display element 7C in the first direction.

The light guide member 78B is fixed to the liquid crystal display element 78C with the display surface 78D, which is a left surface of the liquid crystal display element 78C, being sealed by a sealing member. The light guide member 78B is capable of efficiently reflecting the light incident from the above rightward, while efficiently transmitting the light incident from the right side leftward. The light guide member 78B is a polarizing beam splitter which allows, for example, one of two polarization components orthogonal to each other to pass therethrough, while reflects the other component. The light source (not shown) is connected to an upper surface of the light guide member 78B. In the liquid crystal display device 78, the light emitted by the light source passes through a diffuser plate (not shown) and is diffused to uniformized in-plane light. Further, the light passed through the light source passes through a not-shown polarizing plate and is linearly polarized. The light passed through the polarizing plate is reflected, by the light guide member 78B, toward the liquid crystal display element 78C and is incident on the liquid crystal display element 78C. The incident light is reflected by a display surface 78D of the liquid crystal display element 78C. The reflected light corresponds to the image light 21 of the image displayed on the display surface 78D of the liquid crystal display element 78C.

The second holding member 73 has a holding part 73A and a control substrate 73B. The holding part 73A is arranged on the right side with respect to the liquid crystal display element 78C. The control substrate 73B is arranged on the right side with respect to the holding part 73A. The control substrate 73B is connected to the liquid crystal display element 78C through a flexible printed substrate (not shown). To the control substrate 73B, a communication line 28 is electrically connected. The control substrate 73B receives the image data transmitted by the external device through the communication line 28. The control substrate 73B cause the image unit 7 to display an image corresponding to the image data by outputting a control signal to the liquid crystal display element 78C through the flexible printed substrate.

The lens unit 6 is arranged on the first direction side with respect to the image unit 7. The lens unit 6 introduces the image light 21 emitted by the image unit 7. The lens unit 6 includes a holding member 61 and a plurality of lenses (not shown). The holding member 61 is a substantially cylindrical member extending in the right-left direction. Inside the holding member 61, the plurality of lenses are fixedly secured. The plurality of lenses are arranged on a central axis, which extends in the right-left direction, along the center of the holding member 61. The image light 21 passing through the lens unit 6 is converged by the plurality of lenses. Therefore, a width, in the front-rear direction, of the image light 21 on the first direction side of the lens unit 6 shown in FIG. 3 is shorter at a more downstream side of an optical path.

On the left surface of the holding member 61, a convex part (not shown) protruded leftward is provided. The convex part is configured to engage with the adjustment mechanism 4 which will be described later. The lens unit 6 is held so as to be movable in the front-rear direction by the casing 12. At least a part of a front portion of the holding member 61 is configured to be fitted inside of at least a part of a rear portion of the first holding member 74.

On a front side of the casing 12, an operation member 41 is provided. The operation member 41 is a disk-like member. A central shaft (not shown) of the operation member 41 extends rearward. The operation member 41 is rotatable about the central shaft. The adjustment mechanism 4 is arranged in front of the lens unit 6. The central shaft of the operation member 41 is connected to a central part, when viewed from the front side, of the adjustment mechanism 4. The convex part engages with a portion slightly outside the center of the adjustment mechanism 4 when viewed from the right side.

The adjustment mechanism 4 is a circular member when viewed from the front side. The adjustment mechanism 4 is capable of rotating integrally with the operation member 41 about an axis extending in the right-left direction. When the operation member 41 and the adjustment mechanism 4 are rotated clockwise or counterclockwise, when viewed from the front side, the lens unit 6 moves in the front-rear direction, thereby a relative position between the lenses of the lens unit 6 and the image unit 7 being changed. With this configuration, the user can perform focus adjustment.

A left end of the casing 12 is inclined backward and diagonally leftward. On the left end of the casing 12, an opening 51 opened in the right-left direction is formed. The half mirror 56 is supported inside the opening 51 of the casing 12. The half mirror 56 is arranged on the first direction side with respect to the image unit 7 and the lens unit 6. The half mirror 56 is inclined with respect to the optical axis 97 of the image light 21 emitted by the image unit 7. The half mirror 56 is inclined backward and diagonally leftward. A front side of the half mirror 56 is not covered with the casing 12.

A rear surface of the half mirror 56 will be referred to as a reflective surface 56A. A rearward direction, which intersects with a direction in which the optical axis 97 extends, will be referred to as a second direction. The half mirror 56 is configured to reflect a part (e.g. 50%) of the image light 21 emitted by the image unit 7, with the reflection surface 56A, toward the optical pupil 89 located in the second direction. In the following description, image light which is the reflected light of the image light 21 by the reflective surface 56A will be referred to as an image light 21A. The user's eye can visually recognize the image based on the image light 21A. In the meantime, the half mirror 56 is configured to allow a part of external light incident from the front side thereof to pass therethrough to the rear side. It is noted that the position of the optical pupil 89 is within a movable range of the connection fixture 9 in the second direction and in a front direction which is an opposite direction to the second direction, and on the first direction side with respect to a right end part which is an opposite end part in the first direction of the casing 12. The HMD 1 is capable of making the image light 21A reach the optical pupil 89 at a position described above. Further, it is noted that a preferable distance between the optical pupil 89 and the half mirror 56 is approximately from 2 cm to 5 cm.

As shown in FIG. 2, the cover 80 can be detachably attached around the display device 11. The cover 80 is secured to the display device 11 with not-shown fixing part. The cove 80 is configured to cover at least a part on the first direction side of the casing 12 of the display device 11. Since the display device 11 is covered with the cover 80, cleanliness or dustproof and waterproof characteristic of the display device is improved. According to the present embodiment, as an example, the cover 80 is to cover the display device 11 entirely. The entire cover 80 has light transmission property. The cover 80 is made, for example, of transparent synthetic resin.

The cover 80 is elongated in the right-left direction. In FIG. 3, only a left portion of the cover 80 is shown. So is a cover 83 in FIG. 4 and a cover 86 in FIG. 5, which will be described later. A left wall part of the cover 80 will be referred to a wall part 801. The wall part 801 is a cover part arranged on a first direction side of the half mirror 56. A half mirror 56 side surface of the wall part 801 will be referred to as a covering face 80A. The wall part 801 is inclined with respect to the first direction. The wall part 801 extends backward and diagonally leftward. According to the present embodiment, the wall part 801 and the half mirror 56 are parallel to each other, and the covering face 80A and the reflective surface 56A are parallel to each other. An end part on the first direction side of the wall part 801 is connected to a wall part 802. The wall part 802 extends rearward. A rear end part of the wall part 802 is connected to a wall part 803. The wall part 803 extends rightward.

In the following description, the optical axis of the image light 21A will be referred to as an optical axis 97A. Part of the image light 21 passing through the half mirror 56 in the first direction will be referred to as image light 21B. An optical axis of the image light 21B will be referred to as an optical axis 97B. Part of the image light 21B reflected by the covering face 80A in the second direction will be referred to as image light 21C. It is noted that the image light 21C is image stray light. Further, an optical axis of the image light 21C will be referred to as an optical axis 97C.

An intersection point between the reflective surface 56A of the half mirror 56 and the optical axis 97 will be referred to as a first intersection point 331. An intersection point between the covering face 80A of the wall part 801 and the optical axis 97 will be referred to as a second intersection point 332. A distance, in the first direction, between the first intersection point 331 and the second intersection point 332 will be referred to as a first distance B. An angle at which the covering face 80A inclines with respect to the first direction will be referred to as a first angle θ1. The first angle θ1 and the first distance B are respectively set to be an angle and a distance with which the image light 21C, or the image light passed through the half mirror 56 and reflected by the covering face 80A (i.e., the image stray light) reaches a position different from the position of the optical pupil 89. According to the present embodiment, as an example, the first angle θ1 and the first distance B are respectively set to be an angle and a distance with which the image light 21C, or the image light passed through the half mirror 56 and reflected by the covering face 80A reaches a position which is on a first direction side with respect to the position of the optical pupil 89.

In this case, the image stray light and the ambient tray light are hardily visually recognizable by the user in comparison with a case where the first angle θ1 and the first distance B are set so that the image light 21C reflected by the covering face 80A reaches the position of the optical pupil 89. Accordingly, visibility of the image is improved.

Figure 5:
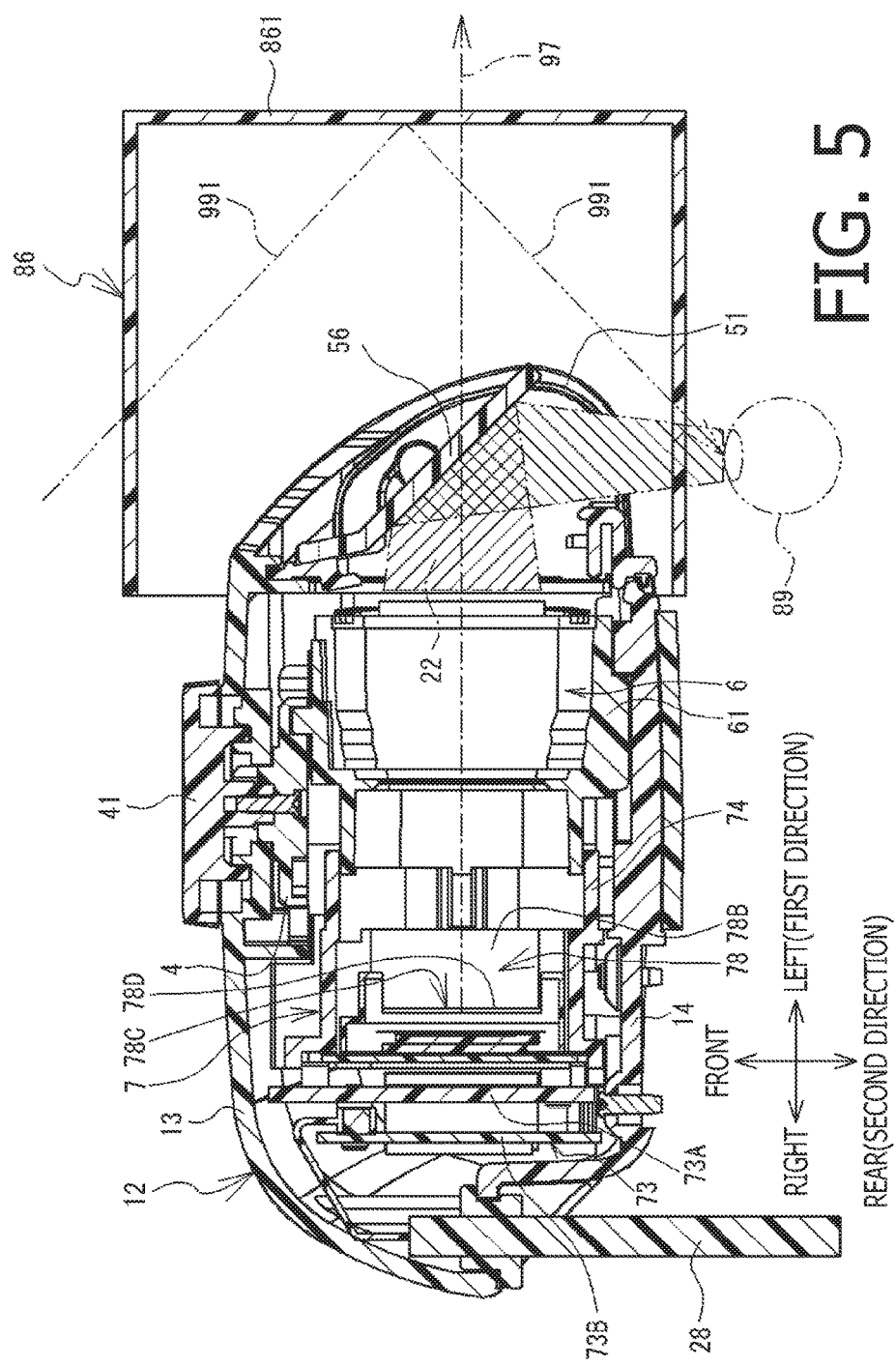
FIG. 5 is an illustrative drawing showing an example when ambient stray light reaches an optical pupil 89.

It is now assumed that, as shown in FIG. 5, a cover 86 which is different from the cover 80, is provided to surround the display device 11. It is assumed that FIG. 5 shows an example of a prior art. A wall part 861, of the cover 86, located on the first direction side with respect to the half mirror 56 extends in the front-rear direction, which is orthogonal to the first direction. In such a configuration, part of the external ambient light is reflected by the wall part 861, and reaches the optical pupil 89 (see arrow 991). Such light is visually recognized as the ambient stray light. According to the present embodiment, the first angle θ1 and the first distance B are set such that the image light 21C reaches at a position on a first direction side with respect to the position of the optical pupil 89. As a result, the ambient stray light hardly reaches the optical pupil 89. Further, although not shown, if the wall part 861 (see FIG. 5) of the prior art is inclined such that a front end thereof is located slightly rightward, there is a possibility that the image light passed through the half mirror 56 and reflected by the wall part 861 reaches the optical pupil 89 as the ambient stray light. According to the present embodiment, however, a condition is set to satisfy equation 1 below, a possibility that the image light passed through the half mirror 56 reaches the optical pupil 89 as the image stray light is further reduced. Hereinafter, equation 1 will be described.

According to the present embodiment, respective parameters are set to satisfy a relationship defined by equation 1.

$$B - \frac{\phi p}{2} - C \times \tan(90 - \theta r) \geq 0 \quad \text{[Equation 1]}$$

where:
B: the first distance;
C: a distance between the second intersection point 332 and the position of the optical pupil 89 in the second direction;
Φp: a diameter of the optical pupil 89; and
θr: an angle of the optical axis 97C of the image light 21C after reflected by the covering face 80A (see FIG. 4).
It is noted that θr is an angle between the optical axis 97 and the optical axis 97C of the image light reflected by the covering face 80A. In the example shown in FIG. 3, θr=90°.

Equation 1 is a conditional equation so that light along the optical axis 97C, among the image light 21C which is reflected light reflected by the covering face 80A, does not reach the outside (the left side, according to the present embodiment) of the position of the optical pupil 89. Therefore, when the respective parameters are set to satisfy Equation 1, it is further ensured that the image light 21C reaches outside the position of the optical pupil 89. Accordingly, it becomes more likely that the entire image light 21C which is reflected by the covering face 80A (i.e., the image stray light) among the image light 21 reaches outside the position of the optical pupil 89. Further, it also becomes likely that the ambient stray light reaches outside the position of the optical pupil 89. Therefore, by setting the respective parameters to satisfy equation 1 above, a possibility that the ambient stray light and the image stray light reach the optical pupil 89 is further reduced. Accordingly, the visibility of the image is improved.

Among the image light 21, a ray of light having an outermost view angle will be referred to an outer side outermost angle ray 22. The outer side outermost angle ray 22 is a ray of light of which view angle is the furthest front side with respect to the position of the optical pupil 89 among the image light 21. Further, a ray of light, among the image light 21, having an inner most view angle will be referred to as an inner side outermost angle ray 23. The inner side outermost angle ray 23 is a ray of light of which view angle is the closest rear side with respect to the position of the optical pupil 89 among the image light 21. Further, an intersection point of the outer side outermost angle ray 22 with respect to the reflective surface 56A will be referred to as a third intersection point 333. An intersection point of the outer side outermost angle ray 22 with respect to the covering face 80A will be referred to as a fourth intersection point 334. An intersection point of the inner side outermost angle ray 23 with respect to the reflective surface 56A will be referred to as a fifth intersection point 335. An intersection point of the inner side outermost angle ray 23 with respect to the covering face 80A will be referred to as a sixth intersection point 336.

When it is assumed that,
δB: a distance between the second intersection point 332 and the third intersection point 333 in the first direction,
δC: a distance between the second intersection point 332 and the fourth intersection point 334 in the second direction,
δB': a distance between the second intersection point 332 and the fifth intersection point 335 in the first direction,
δC': a distance between the second intersection point 332 and the sixth intersection point 336 in the second direction, and
θ: a view angle,
then, respective parameters are set to satisfy equations 2 and 3 below. It is noted that the view angle θ is set in accordance with refraction of the image light 21 by the lens unit 6. The view angle θ is an angle between the first direction and the outer side outermost angle ray 22, or an angle between the first direction and the inner side outermost angel ray 23.

$$(B - \delta B) - \frac{\phi p}{2} - ((C + \delta C) \times \tan((90 - \theta r) - \theta)) \geq 0 \quad \text{[Equation 2]}$$

$$(B + \delta B') - \frac{\phi p}{2} - ((C + \delta C') \times \tan((90 - \theta r) + \theta)) \geq 0 \quad \text{[Equation 3]}$$

Equation 2 is for a ray 22C which is the outer side outermost angle ray 22 after reflected by the covering face 80A reaching outside (left side, according to the present embodiment) the position of the optical pupil 89. Equation 3 is for a ray 23C which is the inner side outermost angle ray 23 after reflected by the covering face 80A reaching outside (left side, according to the present embodiment) the position of the optical pupil 89. Therefore, when the respective parameters are set so that relationships of both the Equations 2 and 3 are satisfied, it is ensured that the entire image light 21C (i.e., the image stray light) after reflected by the covering face 80A, among the image light 21, reaches outside the position of the optical pupil 89. Further, it also becomes likely that the ambient stray light reaches outside the position of the optical pupil 89. Therefore, by setting the respective parameters so that the relationships of the above Equations 2 and 3 are satisfied, a possibility that the ambient stray light and he image stray light reach the position of the optical pupil 89 is further lowered. Accordingly, the visibility of the image is improved.

Hereinafter, concrete examples will be described. As an example, it is assumed that B=5 mm, C=3 mm, and Φp=5 mm. In such a case, a left side of Equation 1 when θr is 90 degrees, 45 degrees, or 52 degrees is calculated as follows.

When θr=90 degrees, 5−2.5−3×0=2.5.

When θr=45 degrees, 5−2.5−3×1=−0.5.

When θr=52 degrees, 5−2.5−3×0.78=0.16.

Therefore, Equation 1 is satisfied when θr=90 degrees and θr=52 degrees, but not satisfied when θr=45 degrees.

It is assumed that δB=1 mm and δC=1 mm. In such a case, a left side of Equation 2 when θr is 90 degrees, 45 degrees, 52 degrees or 70 degrees is calculated as follows.

When θr=90 degrees, (5−1)−2.5−(3+1)×0=1.5.

When θr=45 degrees, (5−1)−2.5−(3+1)×1=−2.5.

When θr=52 degrees, (5−1)−2.5−(3+1)×0.78=−1.62.

When θr=70 degrees, (5−1)−2.5−(3+1)×0.36=0.06.

Therefore, Equation 2 is satisfied when θr=90 degrees and θr=70 degrees, but not satisfied when θr=45 degrees or θr=52 degrees.

It is assumed that δB'=1 mm and δC'=1 mm. In such a case, a left side of Equation 3 when θr is 90 degrees, 45 degrees or 29 degrees is calculated as follows.

When θr=90 degrees, (5+1)−2.5−(3−1)×0=3.5.

When θr=45 degrees, (5+1)−2.5−(3−1)×1=1.5.

When θr=29 degrees, (5+1)−2.5−(3−1)×1.8=−0.1.

Therefore, Equation 3 is satisfied when θr=90 degrees and θr=45 degrees, but not satisfied when θr=29 degrees.

In the above concrete example, taking the diameter of the optical pupil 89 into consideration, when a condition of θr>79 is satisfied, ghost light (i.e., image stray light) does not reach the position of the optical pupil 89, and will not be visually recognized by the user.

In the present embodiment, the second angle θp at which the half mirror 56 inclines with respect to the optical axis 97 is set as:

45°≤θp<90°.

Figure 4:
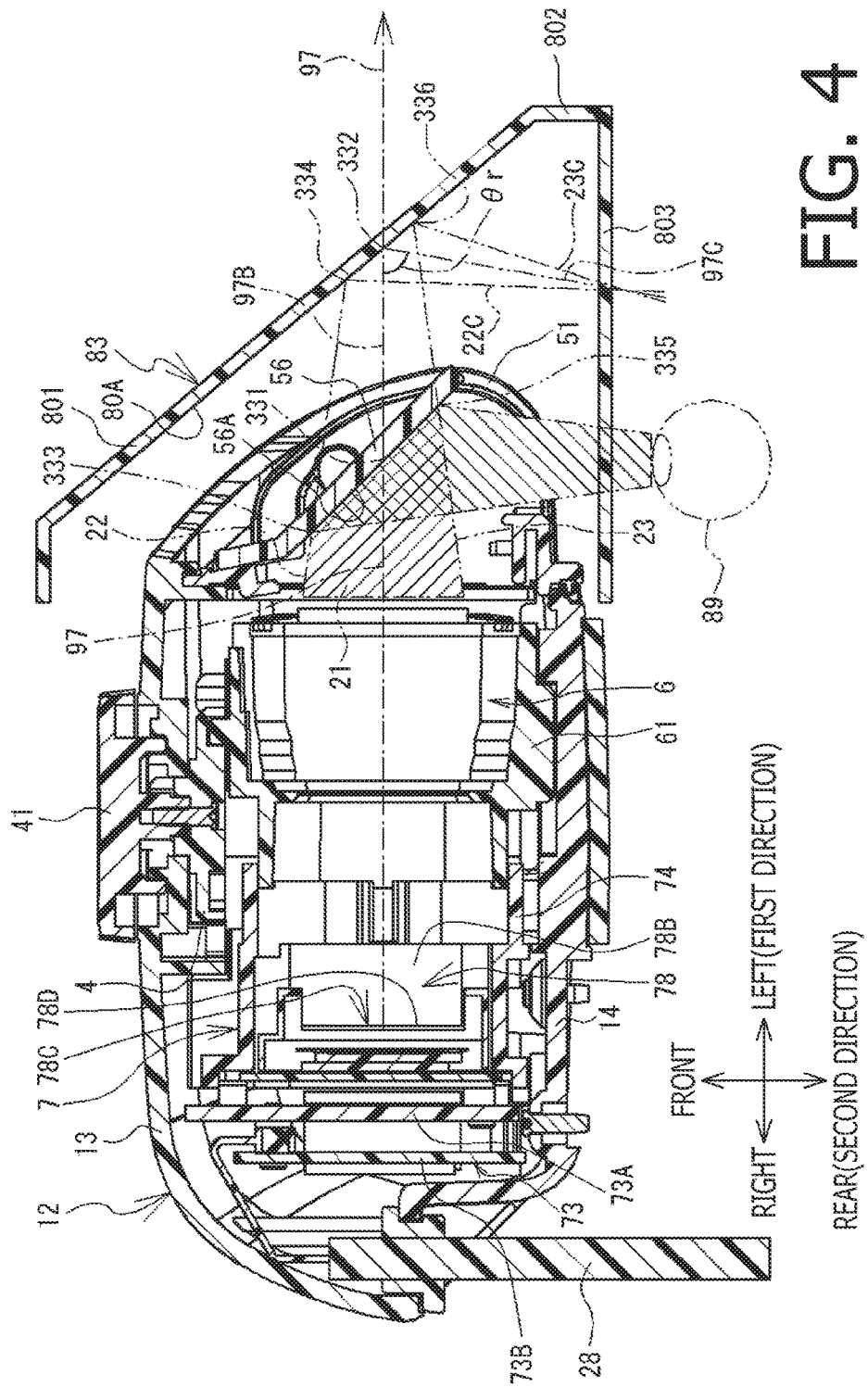
FIG. 4 is a cross-sectional view of the display device 11 using a cover 83 according to a modified embodiment.

In example shown in FIGS. 3 and 4 (described later), the second angle θp is set to 45 degrees. By setting the second angle θp within a range of 45°≤θp<90°, it is ensured that a possibility that the ambient stray light and the image stray light reach the position of the optical pupil 89 is lowered. Accordingly, the HMD 1 is configured such that the visibility of the image is further improved. It is noted that an angle θr is defined such that θr=2(90−θp).

According to the present embodiment, as described above, the covering face 80A and the reflective surface 56A are parallel to each other. Therefore, in comparison with a case where the covering face 80A and the reflective surface 56A are not parallel with each other, a possibility that the external landscape is visually recognized in a distorted state can be lowered. Accordingly, the visibility of the external landscape and the image is improved.

It is noted that the present disclosures are not necessarily be limited to the above-described embodiment, but can be modified in various ways. It is sufficient if the first angle θ1 and the first distance B are set so that the image light 21C, which has passed through the half mirror 56 and has been reflected by the covering face 80A, reaches a position different from the position of the optical pupil 89. For example, the covering face 80A and the reflective surface 56A may not be parallel to each other, and the angle between the covering face 80A and the optical axis 97 may not be limited. In a modified embodiment shown in FIG. 4, a cover 83, which is a modified embodiment of the cover 80 (see FIG. 3) is employed. In the modified embodiment shown in FIG. 4, the covering face 80A and the reflective surface 56A are not parallel with each other. In the example shown in FIG. 3, the first angle θ1 is 45°, while in an example shown in FIG. 4, the first angle θ1 is 50°. Therefore, the image light 21C which is the image stray light slightly approaches the position of the optical pupil 89 as compared to the example shown in FIG. 3. However, since the light is still outside the position of the optical pupil 89, it is not visually recognized by the user.

It is noted that the second angle θp at which angle the half mirror 56 inclines with respect to the optical axis 97 may be an angle other than 45°≤θp<90°. Further, the relationship of Equation 2 or the Equation 3 may not be satisfied. Further, a relationship of Equation 1 may not be satisfied.

It is noted that the HMD 1 is worn on the head of the user with the mounting fixture 8. However, the configuration need not be limited to it. For example, a detachable/attachable mechanism may be provided to a cap of the user, and the HMD 1 may be worn on the head of the user with such a mechanism.

It is further noted that the display device 11 may not be provided with the operation member 41 or the adjustment mechanism 4, and a relative positional relationship between the lens unit 6 and the image unit 7 may be fixed.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

What is claimed is:

1. A head-mounted display, comprising:
    a casing;
    an image forming part arranged inside the casing and configured to form image light;
    a half mirror arranged on a first direction side, the first direction being a direction in which the image forming part emits the image light, with respect to the image forming part, the half mirror inclining with respect to an optical axis of the image light emitted by the image forming part, the half mirror reflecting part of the image light toward a position of an optical pupil located at a second direction side, the second direction being a direction which intersects with the first direction;
a cover covering at least a portion on the first direction side of the casing; and
a wall part provided to the cover and arranged on the first direction side of the half mirror, the wall part having light transmissivity, and inclined with respect to the first direction, wherein, given that:

an intersection point between a reflective surface of the half mirror and the optical axis is defined as a first intersection point;

an intersection point between a covering face, which is a half mirror side surface of the wall part, and the optical axis is defined as a second intersection point;

a distance between the first intersection point and the second intersection point in the first direction is defined as a first distance; and an angle at which the covering face inclines with respect to the first direction is defined as a first angle, the first angle and the first distance are set to an angle and a distance with which the image light passed through the half mirror and reflected by the covering face reaches a position different from the optical pupil position.

2. The head-mounted display according to claim 1, configured to satisfy Equation 1:

$$B - \frac{\phi p}{2} - C \times \tan(90 - \theta r) \geq 0 \quad \text{(Equation 1)}$$

wherein:

B represents the first distance;

C represents a distance between the second intersection point and the optical pupil position in the second direction;

Φp represents a diameter of the optical pupil; and

θr represents an angle of the optical axis of the image light after being reflected by the covering face.

3. The head-mounted display according to claim 2, wherein the image light has an outer side outermost angle ray having an outermost view angle and an inner side outermost angle ray having an innermost view angle, wherein, given that:

an intersection point of the outer side outermost angle ray with respect to the reflective surface is defined as a third intersection point;

an intersection point of the outer side outermost angle ray with respect to the covering face is defined as a fourth intersection point;

an intersection point of the inner side outermost angle ray with respect to the reflective surface is defined as a fifth intersection point; and an intersection point of the inner side outermost angle ray with respect to the covering face is defined as a sixth intersection point, the head-mounted display is configured to satisfy Equations 2 and 3:

$$(B - \delta B) - \frac{\phi p}{2} - ((C + \delta C) \times \tan((90 - \theta r) - \theta)) \geq 0 \quad \text{(Equation 2)}$$

$$(B + \delta B') - \frac{\phi p}{2} - ((C + \delta C') \times \tan((90 - \theta r) + \theta)) \geq 0 \quad \text{(Equation 3)}$$

wherein:

δB represents a distance between the second intersection point and the third intersection point in the first direction;

δC represents a distance between the second intersection point and the fourth intersection point in the second direction;

δB' represents a distance between the second intersection point and the fifth intersection point in the first direction;

δC' represents a distance between the second intersection point and the sixth intersection point in the second direction; and θ represents the view angle.

4. The head-mounted display according to claim 3, wherein a second angle θp at which the half mirror inclines with respect to the optical axis is within a range:

45°≤θp<90°.

5. The head-mounted display according to claim 1, wherein the covering face and the reflective surface are parallel to each other.

6. The head-mounted display according to claim 1, further comprising:

a wearing part which can be mounted on a head of a user; and a supporting part configured to support the casing, the supporting part being movable with respect to the wearing part, wherein the optical pupil position is located within a movable range of the supporting part in the second direction and in a direction opposite to the second direction, and at a position on the first direction side with respect to an end portion of the casing on a side opposite to the first direction.

* * * * *